(12) United States Patent
Kim et al.

(10) Patent No.: US 7,234,829 B2
(45) Date of Patent: Jun. 26, 2007

(54) BACKLIGHT ASSEMBLY AND DISPLAY DEVICE HAVING THE SAME

(75) Inventors: Hyoung-Joo Kim, Uiwang-si (KR); Hyeon-Yong Jang, Osan-si (KR); Sang-Yu Lee, Yongin-si (KR); Seock-Hwan Kang, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 50 days.

(21) Appl. No.: 11/144,711

(22) Filed: Jun. 6, 2005

(65) Prior Publication Data

US 2005/0270800 A1 Dec. 8, 2005

(30) Foreign Application Priority Data

Jun. 7, 2004 (KR) .................. 10-2004-0041424

(51) Int. Cl.
*G09F 13/04* (2006.01)
*A47F 3/00* (2006.01)

(52) U.S. Cl. .................. 362/97; 362/29; 362/294; 362/561; 362/632

(58) Field of Classification Search ................ 362/561, 362/614, 29, 632–634, 97, 294
See application file for complete search history.

(56) References Cited

U.S. PATENT DOCUMENTS

| | | | |
|---|---|---|---|
| 6,787,981 B2* | 9/2004 | Yoo et al. | 313/491 |
| 6,880,947 B2* | 4/2005 | Hsieh et al. | 362/614 |
| 2005/0057946 A1* | 3/2005 | Kim | 362/561 |
| 2005/0169010 A1* | 8/2005 | Shiau | 362/561 |
| 2006/0120074 A1* | 6/2006 | Kim | 362/225 |

* cited by examiner

*Primary Examiner*—Sandra O'Shea
*Assistant Examiner*—James W Cranson, Jr.
(74) *Attorney, Agent, or Firm*—Cantor Colburn LLP

(57) ABSTRACT

A backlight assembly apparatus, including a conductive receiving container, a flat fluorescent lamp provided over the conductive receiving container, and an insulating member positioned between the conductive receiving container and the flat fluorescent lamp to provide insulation.

24 Claims, 12 Drawing Sheets

BACKLIGHT ASSEMBLY AND DISPLAY DEVICE HAVING THE SAME

CROSS-REFERENCE TO RELATED APPLICATIONS

This application relies for priority upon Korean Patent Application No. 2004-41424 filed on Jun. 7, 2004, which is hereby incorporated by reference for all purposes as if fully set forth herein.

BACKGROUND OF THE INVENTION

1. Field of the Invention

The present invention relates to a backlight assembly and a display device having the backlight assembly. More particularly, the present invention relates to a backlight assembly capable of enhancing luminance and luminance uniformity, and a display device having the backlight assembly.

2. Description of the Related Art

An arrangement of liquid crystal molecules changes according to strength and direction of the electric fields when electric fields are applied to liquid crystal. An optical transmissivity changes when the arrangement of the liquid crystal molecules changes.

A liquid crystal display (LCD) device displays an image according to at least the above-mentioned electrical and optical properties. To display an image, the LCD device use an external light or a light generated from a backlight assembly.

The backlight assembly includes a light emitting diode (LED), a cold cathode fluorescent lamp (CCFL), a flat fluorescent lamp, etc. The flat fluorescent lamp has higher luminance and luminance uniformity than the LED or the CCFL. However, improved luminance and luminance uniformity of the flat fluorescent is needed.

SUMMARY OF THE INVENTION

The present invention provides a backlight assembly capable of enhancing luminance and luminance uniformity. The present invention also provides a display device having the above-mentioned backlight assembly.

Additional features of the invention will be set forth in the description which follows, and in part will be apparent from the description, or may be learned by practice of the invention.

The invention discloses a backlight assembly apparatus, including a conductive receiving container, a flat fluorescent lamp provided over the conductive receiving container, and an insulating member provided between the conductive receiving container and the flat fluorescent lamp to provide insulation.

The invention further discloses a backlight assembly apparatus, including a conductive receiving container, a flat fluorescent lamp provided on the conductive receiving container, an insulating member provided between the conductive receiving container and the flat fluorescent lamp, and a heat-transferring member provided at the insulating member to transfer heat generated from the flat fluorescent lamp to the conductive receiving container.

The invention further discloses a display device comprising a backlight assembly apparatus and a display panel transferring light generated from the backlight assembly apparatus into an image.

It is to be understood that both the foregoing general description and the following detailed description are exemplary and explanatory and are intended to provide further explanation of the invention as claimed

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE ILLUSTRATED EMBODIMENTS

It should be understood that the exemplary embodiments of the present invention described below may be varied modified in many different ways without departing from the inventive principles disclosed herein, and the scope of the present invention is therefore not limited to these particular flowing embodiments. Rather, these embodiments are provided so that this disclosure will be thorough and complete, and will fully convey the concept of the invention to those skilled in the art by way of example and not of limitation.

Hereinafter, the embodiments of the present invention will be described in detail with reference to the accompanied drawings.

Figure 1:
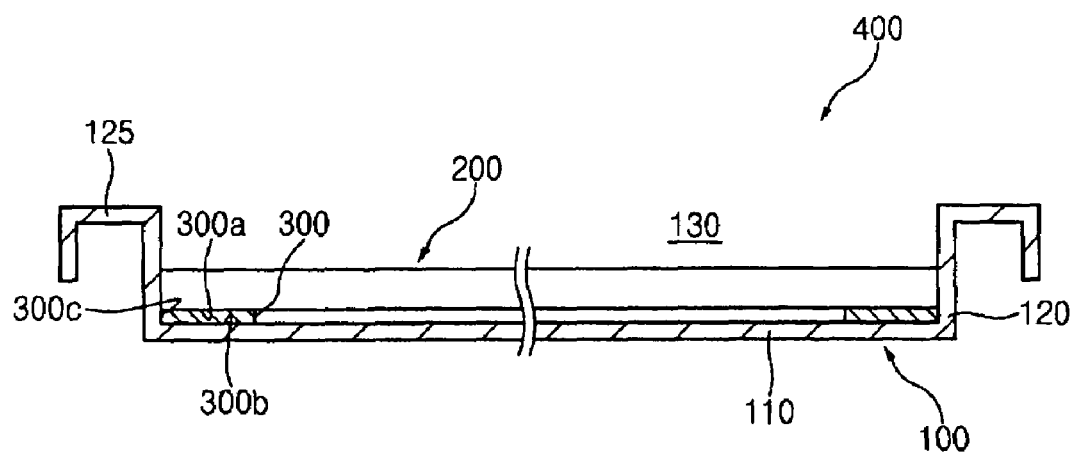
FIG. 1 is a cross-sectional view showing a backlight assembly according to an embodiment of the invention.

FIG. 1 is a cross-sectional view showing a backlight assembly according to an embodiment of the invention. Referring to FIG. 1, the backlight assembly 400 includes a conductive receiving container 100, a flat fluorescent lamp 200 and an insulating member 300. The conductive receiving container 100 includes a bottom plate 110 and sidewalls 120. The conductive receiving container 100 includes metal that is lightweight with high mechanical strength, for example, aluminum alloy, magnesium alloy, etc.

The bottom plate 110 has substantially a same shape as that of a display panel (not shown) that is to be supported by the bottom plate 110. For example, the bottom plate 110 and the display panel may be rectangular shaped. The sidewalls 120 are provided on the bottom plate 110. The sidewalls may protrude or extend from an edge portion of the bottom plate 110. The sidewalls 120 include a support portion 125. A portion of the sidewalls 120 is shaped to define the support portion 125. The support portion 125 supports a light-diffusing member or a display panel.

The flat fluorescent lamp 200 is provided on the bottom plate 110 of the conductive receiving container 100. The flat fluorescent lamp 200 and the display panel have substantially the same shape. The flat fluorescent lamp 200 is, for example, a rectangular shape. The flat fluorescent lamp 200 provides the display panel with light.

The insulating member 300 is provided between the flat fluorescent lamp 200 and the bottom plate 110 of the conductive receiving container 100. The insulating member 300 may be made of material having high electrical resistivity. The insulating member 300 may include, for example, resin.

The insulating member 300 separates the flat fluorescent lamp 200 from the conductive receiving container 100 to electrically insulate the flat fluorescent lamp 200 from the conductive receiving container 100.

When a thickness of the insulating member 300, a thickness of the backlight assembly 400 increases, which reduces the possibility of an electrical short therein. On the contrary, when the thickness of the insulating member 300 decreases, the flat fluorescent lamp 200 and the conductive receiving container 100 may electrically short. Therefore, the thickness of the insulating member 300 is adjusted considering the thickness of the backlight assembly 400. The insulating member 300 may have, for example, a rod shape.

According to the embodiment of the invention shown in FIG. 1, the backlight assembly 400 includes the flat fluorescent lamp 200, the conductive receiving container 100, and the insulating member 300 that is provided therebetween.

Figure 2:
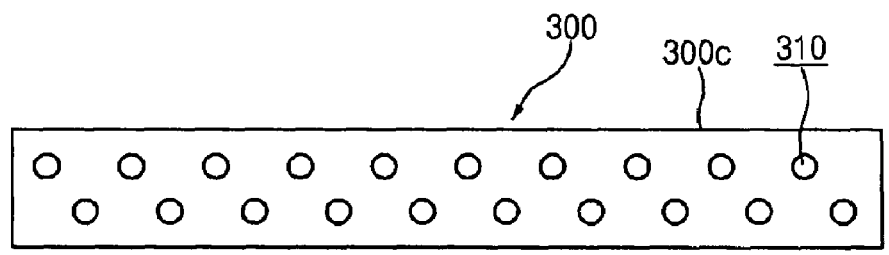
FIG. 2 is a plan view showing an insulating member of a backlight assembly according to an embodiment of the invention.

FIG. 2 is a plan view illustrating an insulating member of a backlight assembly according to an embodiment of the invention.

Referring to FIG. 1 and FIG. 2, the insulating member 300 has, for example, a rectangular shape. The insulating member 300 has an upper face (or first face) 300a, a lower face (or second face) 300b positioned opposite or adjacent to the upper face 300a, and four side faces 300c.

In order to enhance luminance uniformity of light generated from the flat fluorescent lamp 200, the insulating member 300 includes at least one hole 310. The hole 310 is formed such that is penetrates the insulating member 300, so that the bottom plate 110 faces the flat fluorescent lamp 200 through the hole 310.

A parasitic capacitance is generated between the flat fluorescent lamp 200 and the conductive receiving container 100. The parasitic capacitance generated between the flat fluorescent lamp 200 and the conductive receiving container 100 may not uniform throughout all regions of the flat fluorescent lamp 200 due to the insulating member 300. Specifically, the insulating member 300 has a first dielectric constant, and air has a second dielectric constant that is lower than the first dielectric constant. Therefore, the parasitic capacitance generated between the flat fluorescent lamp 200 and the conductive receiving container 100 with the insulating member 300 interposed therebetween is greater than the parasitic capacitance generated between the flat fluorescent lamp 200 and the conductive receiving container 100 with air interposed therebetween, such that it induces light generated from the flat fluorescent lamp 200 to have non-uniform luminance.

Therefore, when the insulating member 300 includes the hole 310, parasitic capacitance between the flat fluorescent lamp 200 and the conductive receiving container 100 may be reduced to enhance luminance uniformity. Furthermore, heats generated by the flat fluorescent lamp 200 may be easily exhausted through the hole 310.

The hole 310 of the insulating member 300 may be variously shaped as long as the insulating member 300 reduces the parasitic capacitance.

The insulating member 300 includes the hole 310 in order to reduce a difference of the parasitic capacitance between the flat fluorescent lamp 200 and the conductive receiving container 100. The insulating member 300 may include at least one recession recessed from at least one of the upper face 300a and lower face 300b to confine air instead of having the hole 310. Alternatively, the insulating member 300 may include both the hole 310 and the recession to confine air.

Figure 3:
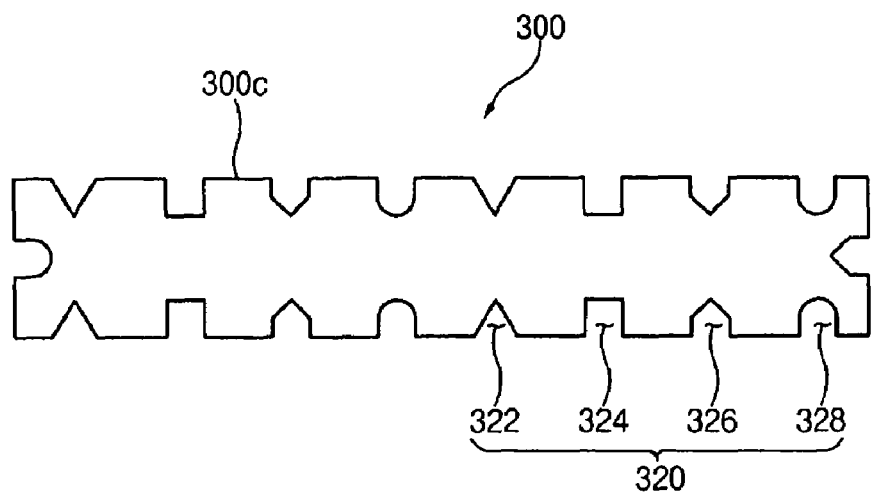
FIG. 3 is a plan view showing an insulating member of a backlight assembly according to an embodiment of the invention.

FIG. 3 is a plan view showing an insulating member of a backlight assembly according to an embodiment of the invention. Referring to FIG. 1 and FIG. 3, the insulating member 300 has, for example, a rectangular shape. The insulating member 300 has an upper face (or first face) 300a, a lower face (or second face) 300b that is positioned opposite or adjacent to the upper face 300a, and four side faces 300c.

To enhance luminance uniformity of light generated from the flat fluorescent lamp 200, the insulating member 300 includes at least one recessed portion 320. The recessed portion 320 is recessed from the side faces 300c of the insulating member 300, so that the bottom plate 110 of the conductive receiving container 100 faces the flat fluorescent lamp 200 through the recessed portion 320.

A parasitic capacitance is generated between the flat fluorescent lamp 200 provided on the upper face 300a of the insulating member 300, and the conductive receiving container 100. The parasitic capacitance generated between the flat fluorescent lamp 200 and the conductive receiving container 100 is not uniform throughout all regions of the flat fluorescent lamp 200 due to the insulating member 300. Specifically, the insulating member 300 has a first dielectric constant and air has a second dielectric constant that is lower than the first dielectric constant. Therefore, the parasitic capacitance generated between the flat fluorescent lamp 200 and the conductive receiving container 100 with the insulating member 300 provided therebetween is greater than the parasitic capacitance generated between the flat fluorescent lamp 200 and the conductive receiving container 100 with air interposed therebetween; such that it induces light generated from the flat fluorescent lamp 200 to have non-uniform luminance.

However, when the insulating member 300 includes the recessed portion 320, a difference of the parasitic capacitance between the flat fluorescent lamp 200 and the conductive receiving container 100 may be reduced to enhance luminance uniformity. Further, heats generated by the flat fluorescent lamp 200 may be vented through the recessed portion 320.

The recessed portion 320 of the insulating member 300 may have various shapes as long as the insulating member 300 reduces the parasitic capacitance. The insulating member may include, for example, a triangular recessed portion 322, a rectangular recessed portion 324, a pentagonal recessed portion 326, and/or a semi-circular recessed portion 328.

According to an embodiment of the invention shown in FIG. 3, the insulating member 300 includes the recessed portion 320 in order to reduce a difference of the parasitic capacitance. The insulating member 300 may include at least one recession recessed from at least one of the upper and lower faces 300a and 300b to confine air instead of having the recessed portion 324. Alternatively, the insulating member 300 may include both the recessed portion 320 and the recession to confine air.

Figure 4:
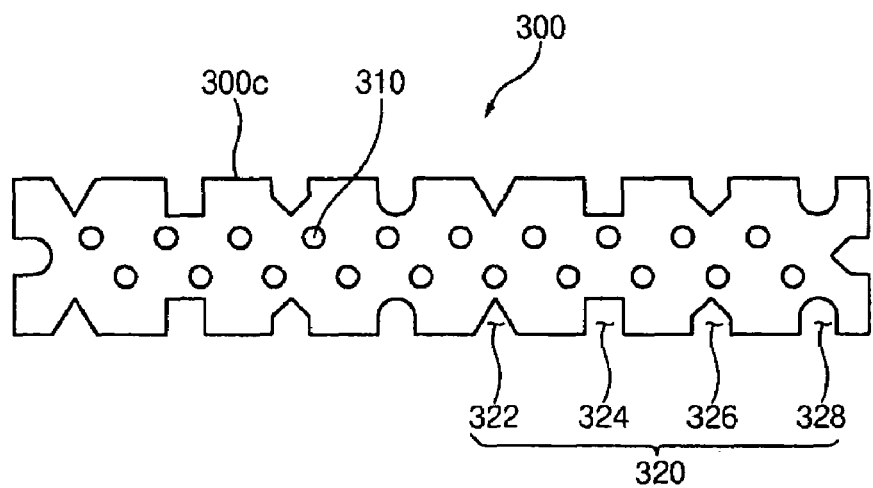
FIG. 4 is a plan view showing an insulating member of a backlight assembly according to an embodiment of the invention.

FIG. 4 is a plan view showing an insulating member of a backlight assembly according to an embodiment of the invention. Referring to FIG. 1 and FIG. 4, the insulating member 300 has, for example, a rectangular shape. The insulating member 300 has an upper face (or first face) 300a, a lower face (or second face) 300b that is positioned opposite or adjacent to the upper face 300a, and four side faces 300c.

To improve luminance uniformity of light generated from the flat fluorescent lamp 200, the insulating member 300 includes at least one hole 310 and at least one recessed portion 320. The hole 310 penetrates the insulating member 300 so that the bottom plate 110 of the conductive receiving container 100 faces the flat fluorescent lamp 200 through the hole 310. The recessed portion 320 is recessed from the side faces 300c of the insulating member 300 such that the bottom plate 110 of the conductive receiving container 100 faces the flat fluorescent lamp 200 through the recessed portion 320.

A parasitic capacitance is generated between the flat fluorescent lamp 200 provided on the upper face 300a of the insulating member 300 and the conductive receiving container 100. The parasitic capacitance generated between the flat fluorescent lamp 200 and the conductive receiving container 100 is not uniform throughout all regions of the flat fluorescent lamp 200 due to the insulating member 300. Specifically, the insulating member 300 has a first dielectric constant and air has a second dielectric constant that is lower than the first dielectric constant. Therefore, the parasitic capacitance generated between the flat fluorescent lamp 200 and the conductive receiving container 100 with the insulating member 300 provided therebetween is greater than the parasitic capacitance generated between the flat fluorescent lamp 200 and the conductive receiving container 100 with air interposed therebetween, such that it induces non-uniformity of light luminance generated from the flat fluorescent lamp 200.

Therefore, when the insulating member 300 includes the hole 310 and the recessed portion 320, a difference of the parasitic capacitance between the flat fluorescent lamp 200 and the conductive receiving container 100 may be reduced to improve luminance uniformity. Further, heat generated by the flat fluorescent lamp 200 may vent through the hole 310 and the recessed portion 320.

The hole 310 and the recessed portion 320 of the insulating member 300 may each have arbitrary shapes as long as the insulating member 300 reduces the parasitic capacitance.

According to an embodiment of the invention shown in FIG. 4, the insulating member 300 includes the hole 310 and the recessed portion 320 in order to reduce a difference of the parasitic capacitance between the flat fluorescent lamp 200 and the conductive receiving container 100. The insulating member 300 may include at least one recession recessed from at least one of the upper face 300a and the lower faces 300b to confine air instead of having the hole 310 and the recessed portion 320 to confine air. Alternatively, the insulating member 300 may include the hole 310, the recessed portion 320, and the recession to confine air.

Figure 5:
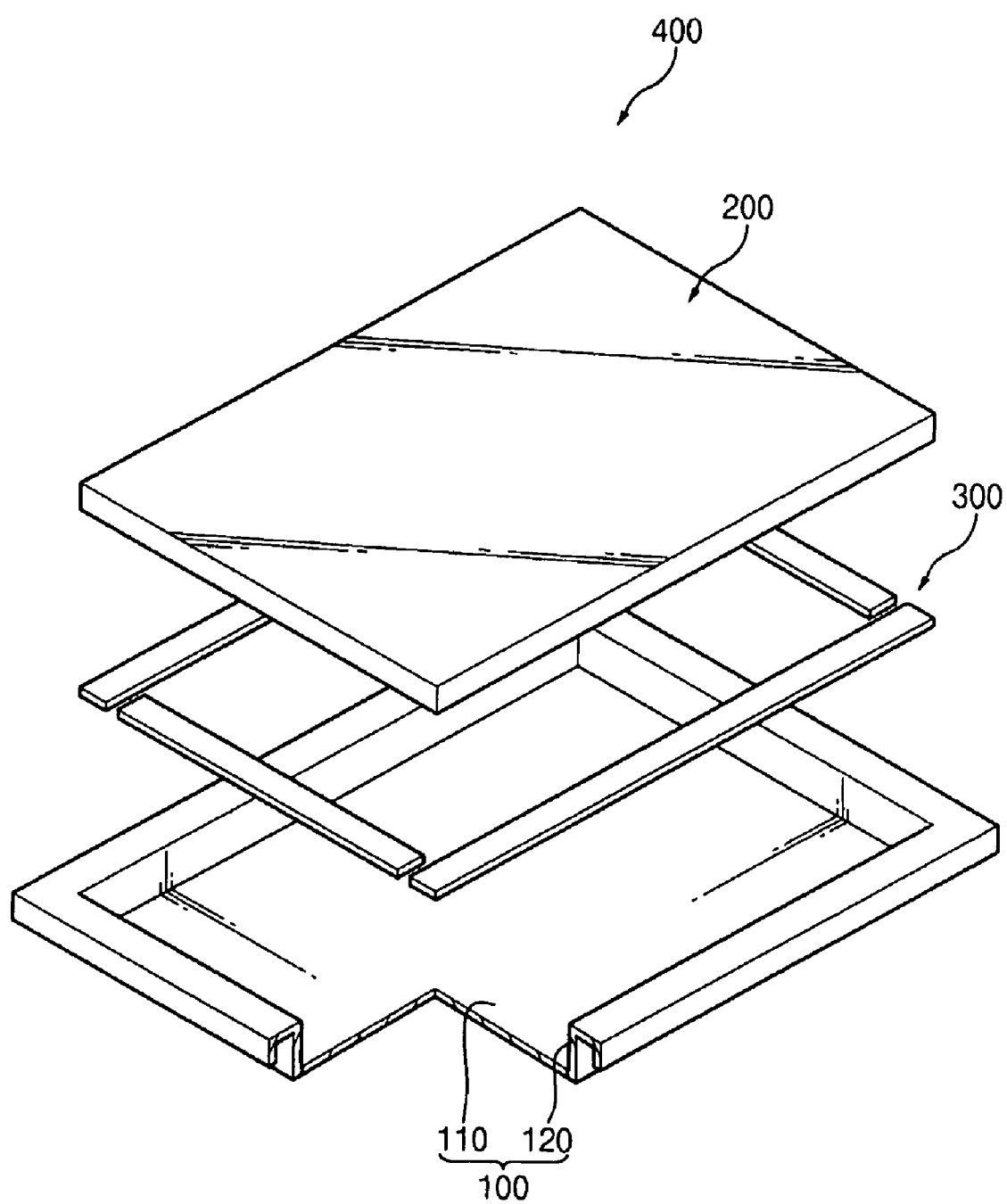
FIG. 5 is an exploded perspective view showing a backlight assembly according is to another embodiment of the invention.
Figure 6:
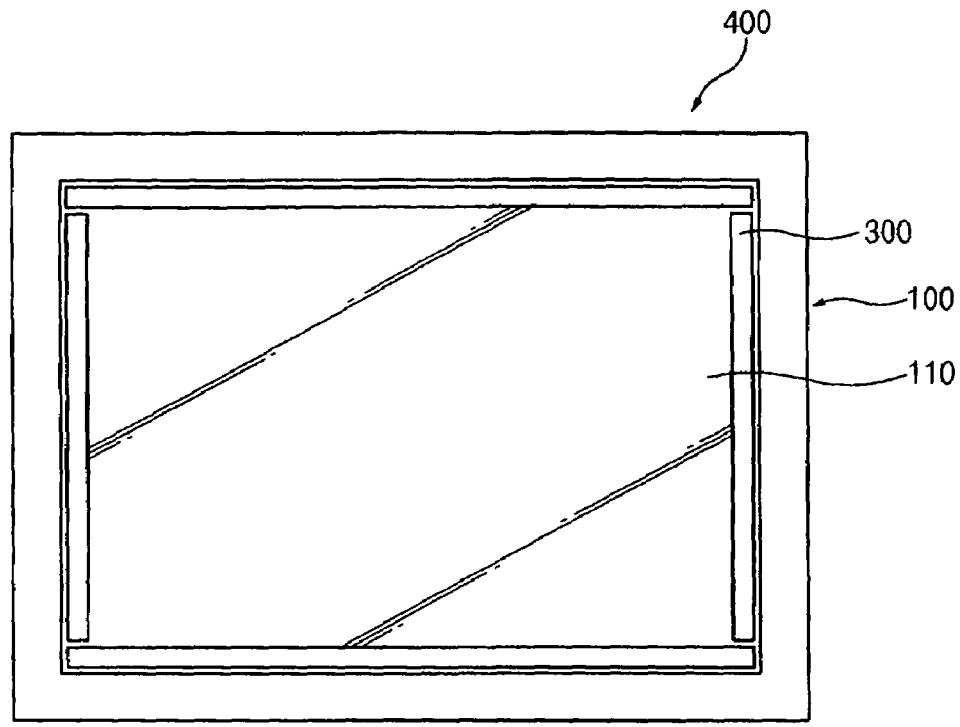
FIG. 6 is a plan view showing a conductive receiving container and an insulating member as shown in FIG. 5.

FIG. 5 is an exploded perspective view showing a backlight assembly according to an embodiment of the invention. FIG. 6 is a plan view showing a conductive receiving container and an insulating member as shown in FIG. 5.

Referring to FIG. 5 and FIG. 6, at least two insulating members 300 are provided between the flat fluorescent lamp 200 and the conductive receiving container 100. For example, as shown in FIG. 5, four insulating members 300 may be arranged along edge portions of the flat fluorescent lamp 200 having a rectangular shape. Each of the insulating members 300 may have, for example, a rectangular, rod-like, or a parallel-pipe like shape. Alternatively, two insulating members 300 may be disposed parallel to each other along edge portions of the flat fluorescent is lamp 200. The insulating members 300 may be fastened to or attached with one of the flat fluorescent lamp 200 and the bottom plate 110 of the conductive receiving container 100 by, an adhesive (not shown), a double-faced tape, screws, etc.

Figure 7:
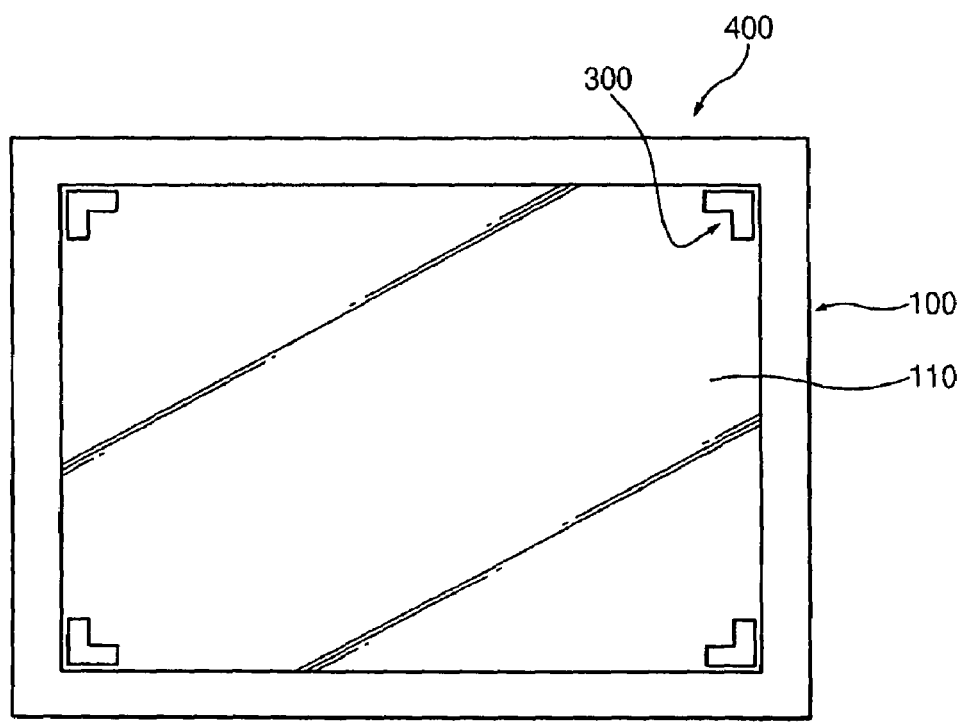
FIG. 7 is a plan view illustrating a conductive receiving container and an insulating member of a backlight assembly according to an embodiment of the invention.

FIG. 7 is a plan view showing a conductive receiving container and an insulating member of a backlight assembly according to an embodiment of the invention.

Referring to FIG. 1 and FIG. 7, an insulating member 300 is provided at each of the four corners of the bottom plate 110 of the conductive receiving container 100. Each of the conductive receiving containers 100 has an L-shape. In other words, each of the conductive containers 100 corresponds to an L-shaped plate. It is understood that the invention is not limited to having four insulating members that are L-shaped. Instead, there may be any number of insulting members 300 having various shapes.

The insulating members 300 having the L-shape reduce a surface area of the insulating members 300, which reduces variation of the parasitic capacitance. Therefore, luminance of light emitted from the flat fluorescent lamp that is provided on the insulating members 300 is improved.

Figure 8:
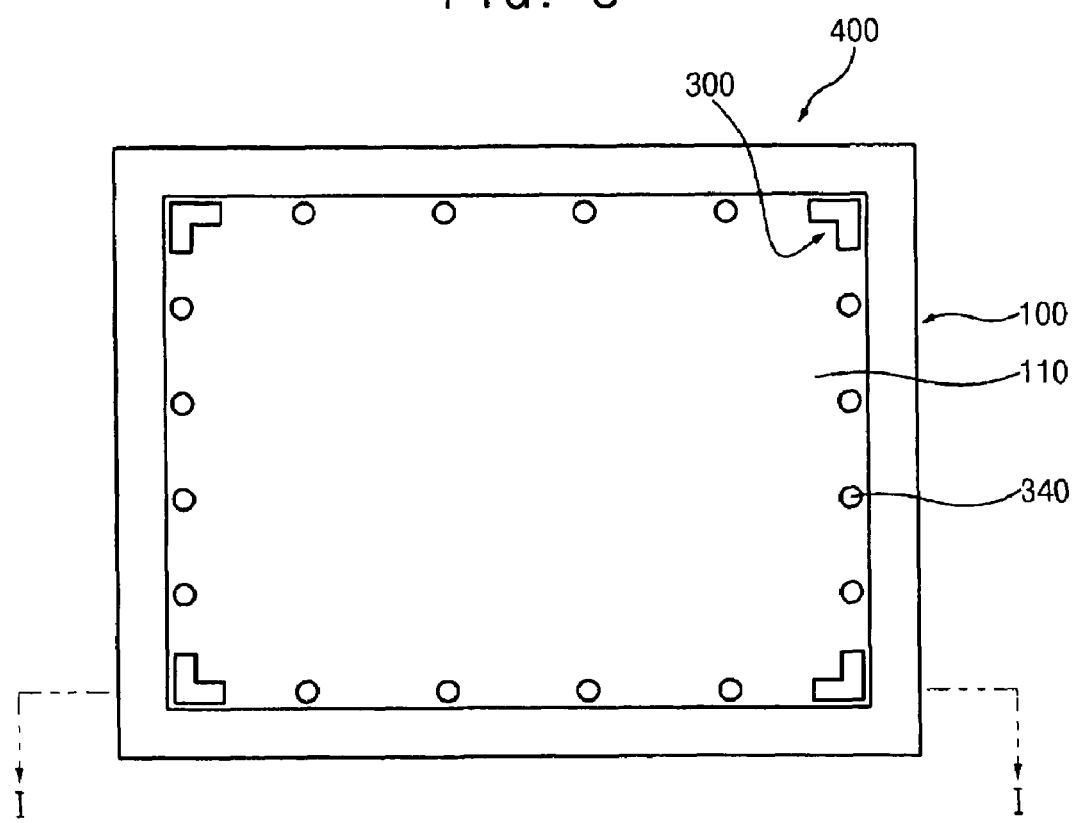
FIG. 8 is a plan view illustrating a conductive receiving container and an insulating member of a backlight assembly according to an embodiment of the invention.
Figure 9:
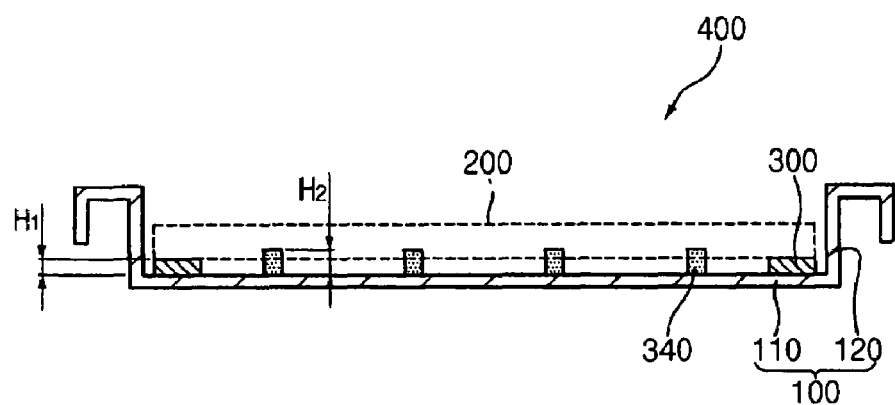
FIG. 9 is a cross-sectional view taken along a line I–I' shown in FIG. 8.

FIG. 8 is a plan view showing a conductive receiving container and an insulating member of a backlight assembly according to an embodiment of the invention. FIG. 9 is a cross-sectional view taken along a line I–I' shown in FIG. 8.

Referring to FIG. 8 and FIG. 9, an insulating member 300 may be provided at each of corner of the bottom plate 110 of the conductive receiving container 100. Each of insulating member 100 may be L-shaped. However, it is understood that the insulating members 100 may be variously shaped and is not limited to the L-shape.

The insulating members 300 of the backlight assembly 400 are sufficiently strong to prevent an electrical short from occurring between the flat fluorescent lamp 200 and the conductive receiving container 100 when a mechanical impact is applied to the insulating members 300. Otherwise, if the insulating members 300 are not able to sufficiently absorb the mechanical impact applied to the insulating members 300, the flat fluorescent lamp 200 may be damaged. It is understood that the invention is not limited to having four insulating members that are L-shaped. Instead, there may be any number of insulting members 300 having various shapes.

To prevent the damage of the flat fluorescent lamp 200, impact-absorbing members 340 may be provided on the bottom plate 110 of the conductive receiving container 100 between the insulating members 300. The impact-absorbing members 340 have a height H2 that is greater than a height H1 of the insulating members 300. Further, the impact-absorbing members 340 are sufficiently elastic so that they are able to absorb the impact that is applied to the flat fluorescent lamp 200. The impact-absorbing members 340 may be provided at a bottom side of the flat fluorescent lamp 200.

Figure 10:
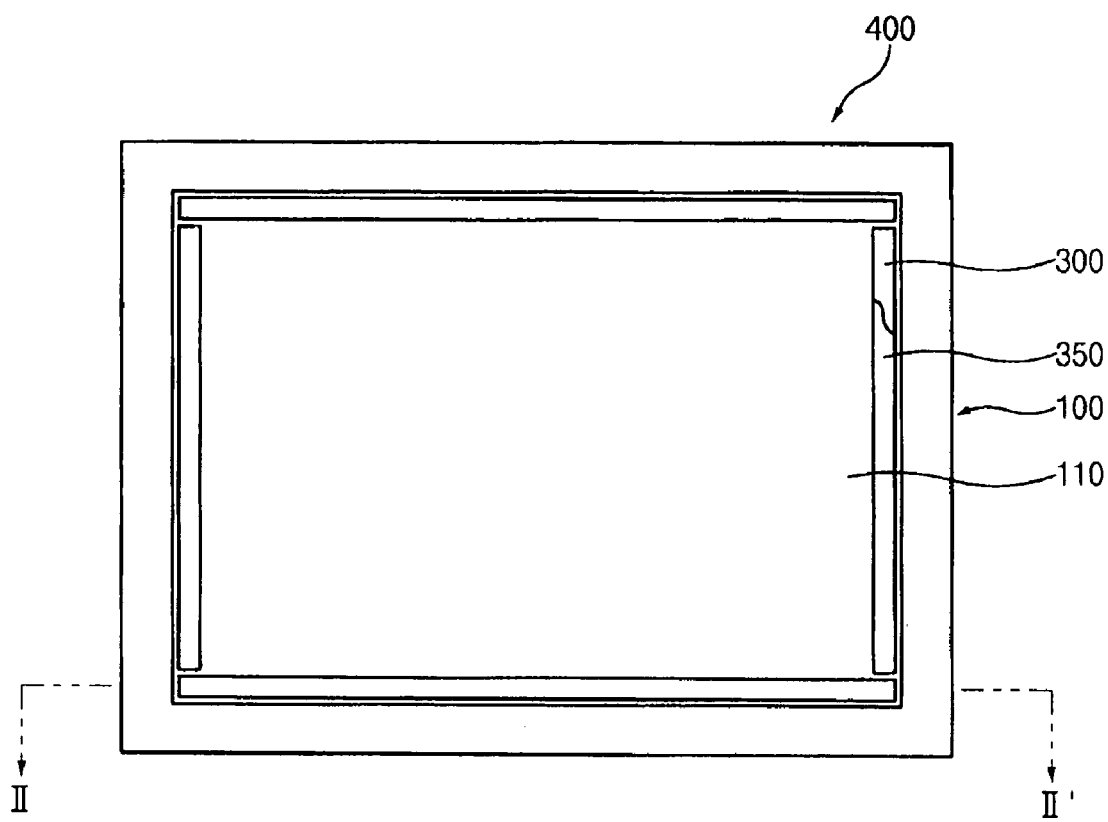
FIG. 10 is a plan view showing a conductive receiving container and an insulating member of a backlight assembly according to an embodiment of the invention.
Figure 11:
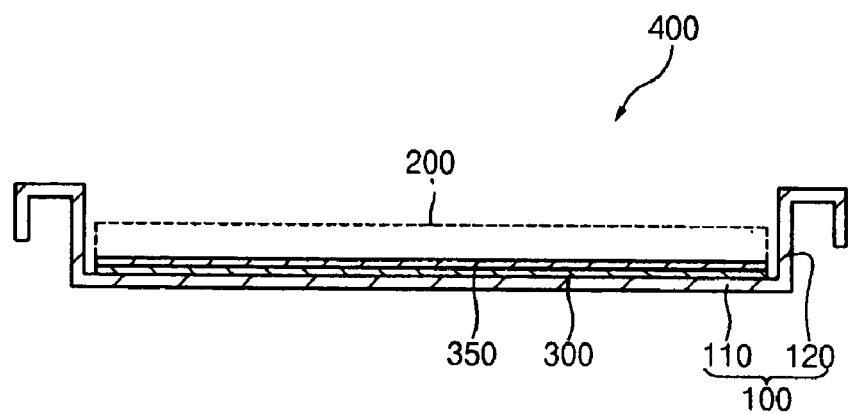
FIG. 11 is a cross-sectional view taken along a line II–II' shown in FIG. 10.

FIG. 10 is a plan view showing a conductive receiving container and an insulating member of a backlight assembly according to an embodiment of the invention. FIG. 11 is a cross-sectional view taken along a line II–II' shown in FIG. 10.

Referring to FIG. 10 and FIG. 11, the insulating members 300 may be provided on the bottom plate 110 of the conductive receiving container 100 to prevent an electrical short from occurring between the conductive receiving container 100 and the flat fluorescent lamp 200. Each of the insulating members 300 may be rectangular shaped. Thus, according to the embodiment of the invention discussed above and shown in FIG. 10 and FIG. 11, the flat fluorescent lamp 200 may be rectangular shaped and include insulating members 300 provided along edge portions of the flat fluorescent lamp 200.

Impact-absorbing members 350 may be provided on a top surface of each of the insulating members 300. The impact-absorbing members 350 may have a substantially identical shape as the insulating members 300. The impact-absorbing members 350 prevent damage of the flat fluorescent lamp 200 caused by mechanical impact.

Figure 12:
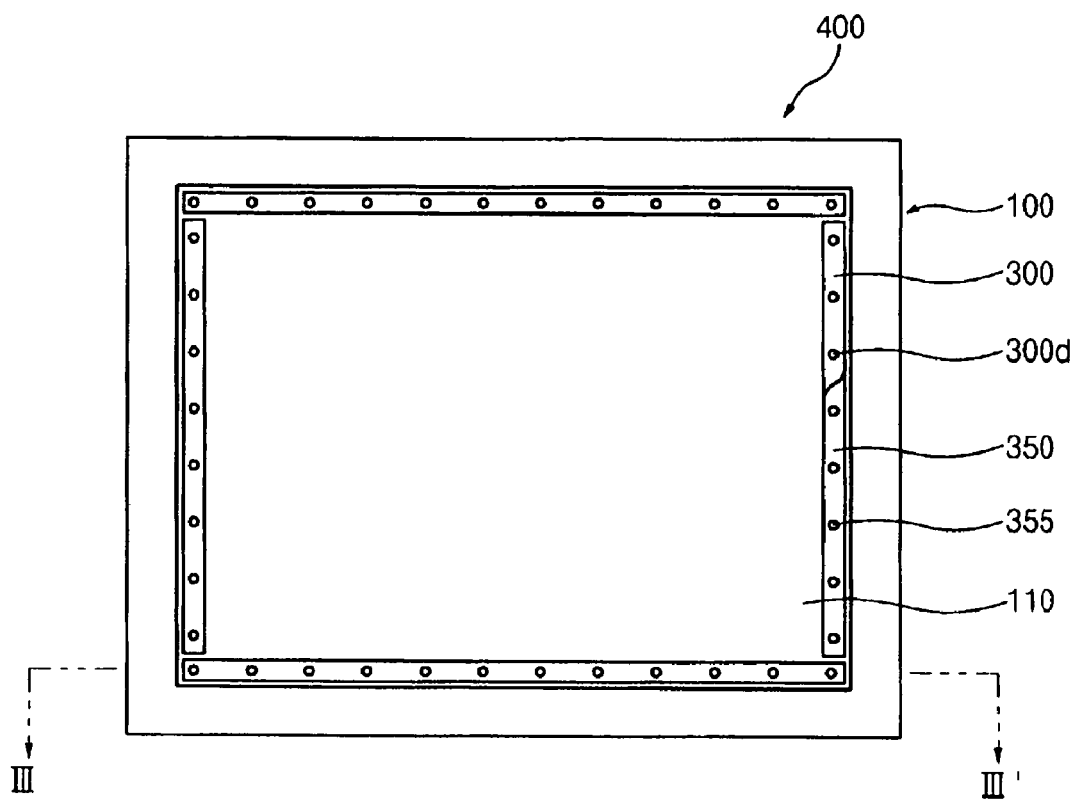
FIG. 12 is a plan view showing a conductive receiving container and an insulating member of a backlight assembly according to an embodiment of the invention.
Figure 13:
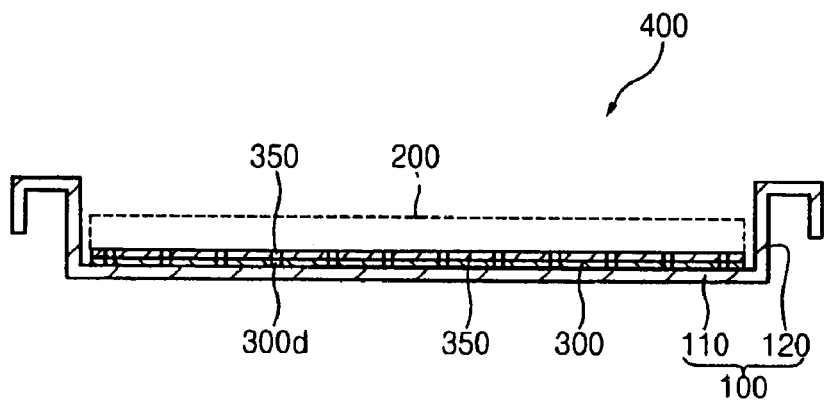
FIG. 13 is a cross-sectional view taken along a line III–III' shown in FIG. 12.

FIG. 12 is a plan view showing a conductive receiving container and an insulating member of a backlight assembly according to an embodiment of the invention. FIG. 13 is a cross-sectional view taken along a line III–III' shown in FIG. 12.

Referring to FIG. 12 and FIG. 13, the insulating members 300 are provided on the bottom plate 110 of the conductive receiving container 100 to prevent an electrical short from occurring between the conductive receiving container 100 and the flat fluorescent lamp 200. Each of the insulating members 300 may be rectangular shaped. According to the embodiment of the invention discussed above and shown in FIG. 12 and FIG. 13, the flat fluorescent lamp 200 may be rectangular shaped and include an insulating members 300 along each edge portion of the flat fluorescent lamp 200.

Impact-absorbing members 350 are provided on a top surface of the insulating members 300. The impact-absorbing members 350 have a substantially identical shape as the insulating members 300. The impact-absorbing members 350 prevent damage of the flat fluorescent lamp 200 due to an external impact.

The insulating member 300 has a first hole 300d, and the impact-absorbing member 350 has a second hole 355.

The first hole 300d of the insulating member 300 and the second hole 355 of the impact-absorbing member 350 may be positioned at same position such that they are connected together. Alternatively, the first hole 300d and the second hole 355 may be positioned at different positions, respectively.

The first hole 300d and the second hole 355 contain air to reduce a variation of the parasitic capacitance between a center region of the flat fluorescent lamp 200 and an edge portion of the flat fluorescent lamp 200 so that luminance of the flat fluorescent lamp 200 is substantially uniform. Further, heats generated from the flat fluorescent lamp 200 may be vented or released through the first hole 300d and the second hole 355.

Figure 14:
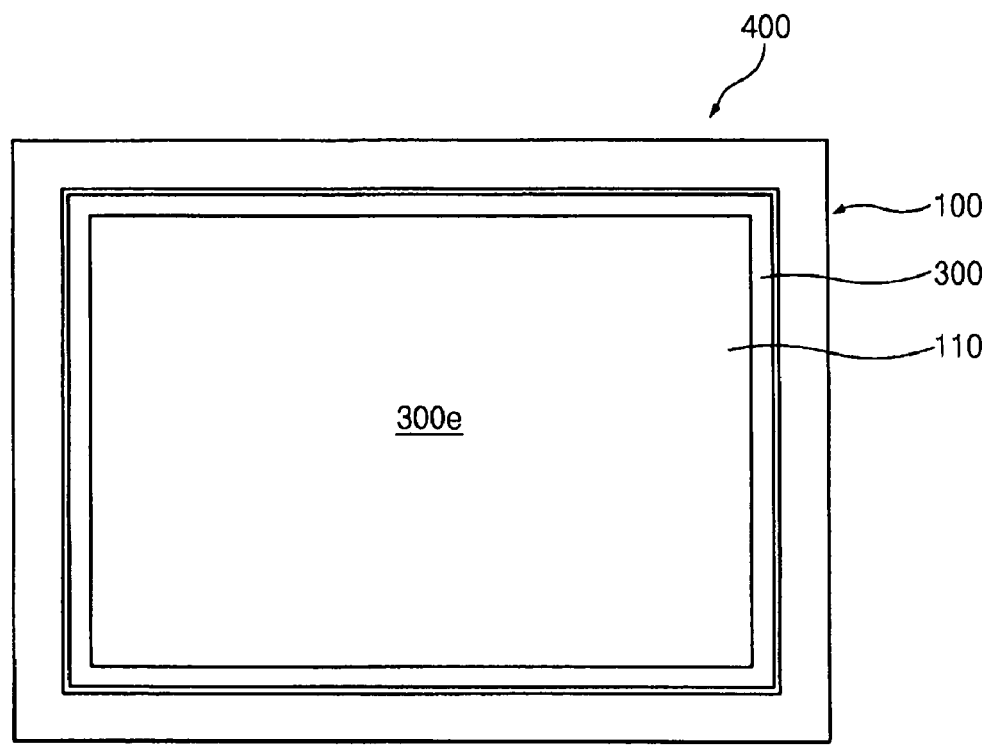
FIG. 14 is a plan view showing a conductive receiving container and an insulating member of a backlight assembly according to a tenth exemplary embodiment of the present invention.

FIG. 14 is a plan view showing a conductive receiving container and an insulating member of a backlight assembly according to an embodiment of the invention.

Referring to FIG. 14, an insulating member 300 may have a frame shape, e.g., a center region 300e of the insulating member 300 is open, which reduces manufacturing and assembly processes of the backlight assembly.

Figure 15:
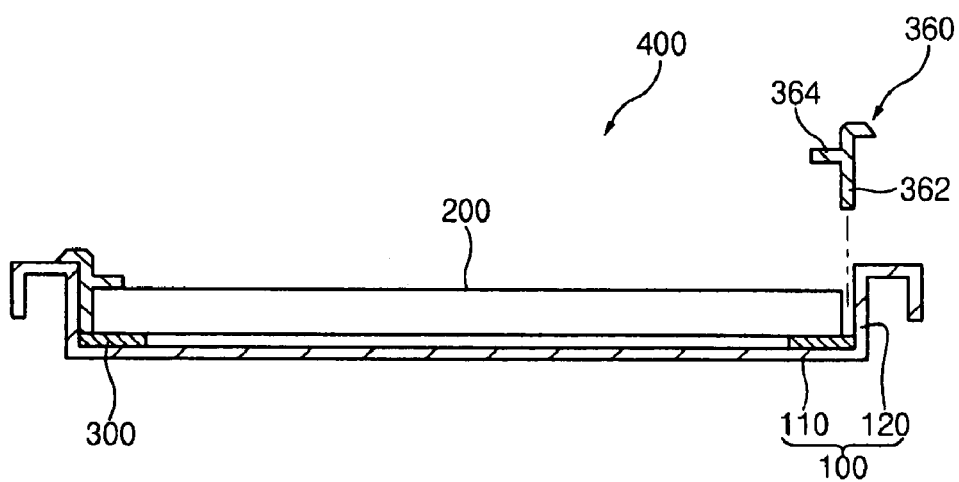
FIG. 15 is a cross-sectional view showing a combining member of a backlight assembly according to an embodiment of the invention.

FIG. 15 is a cross-sectional view showing a combining member of a backlight assembly according to an embodiment of the invention. Referring to FIG. 15, a backlight assembly 400 includes a combining member 360 to fix or attach the flat fluorescent lamp 200, which is provided on the insulating member 300, to the conductive receiving container 100.

The combining member 360 is provided between a side face of the flat fluorescent lamp 200 and a sidewall 120 of the conductive receiving container 100 and compresses an upper portion of the flat fluorescent lamp 200 to fasten or attach the flat fluorescent lamp 200 with the conductive receiving container 100.

The combining member 360 includes a first combining portion 362 and a second combining portion 364. The first combining portion 362 is provided between the side face of the flat fluorescent lamp 200 and the sidewall 120 of the conductive receiving container 100 to prevent the flat fluorescent lamp 200 from moving or shifting along a horizontal direction. The second combining portion 364 protrudes or extends from the first combining portion 363 and forms a 'T'-shape; however, the shape of the second combining portion 364 is not limited to such shape and may be variously shaped. The second combining portion 364 compresses the upper portion of the flat fluorescent lamp 200 to prevent the flat fluorescent lamp 200 from moving or shifting along a vertical direction.

Figure 16:
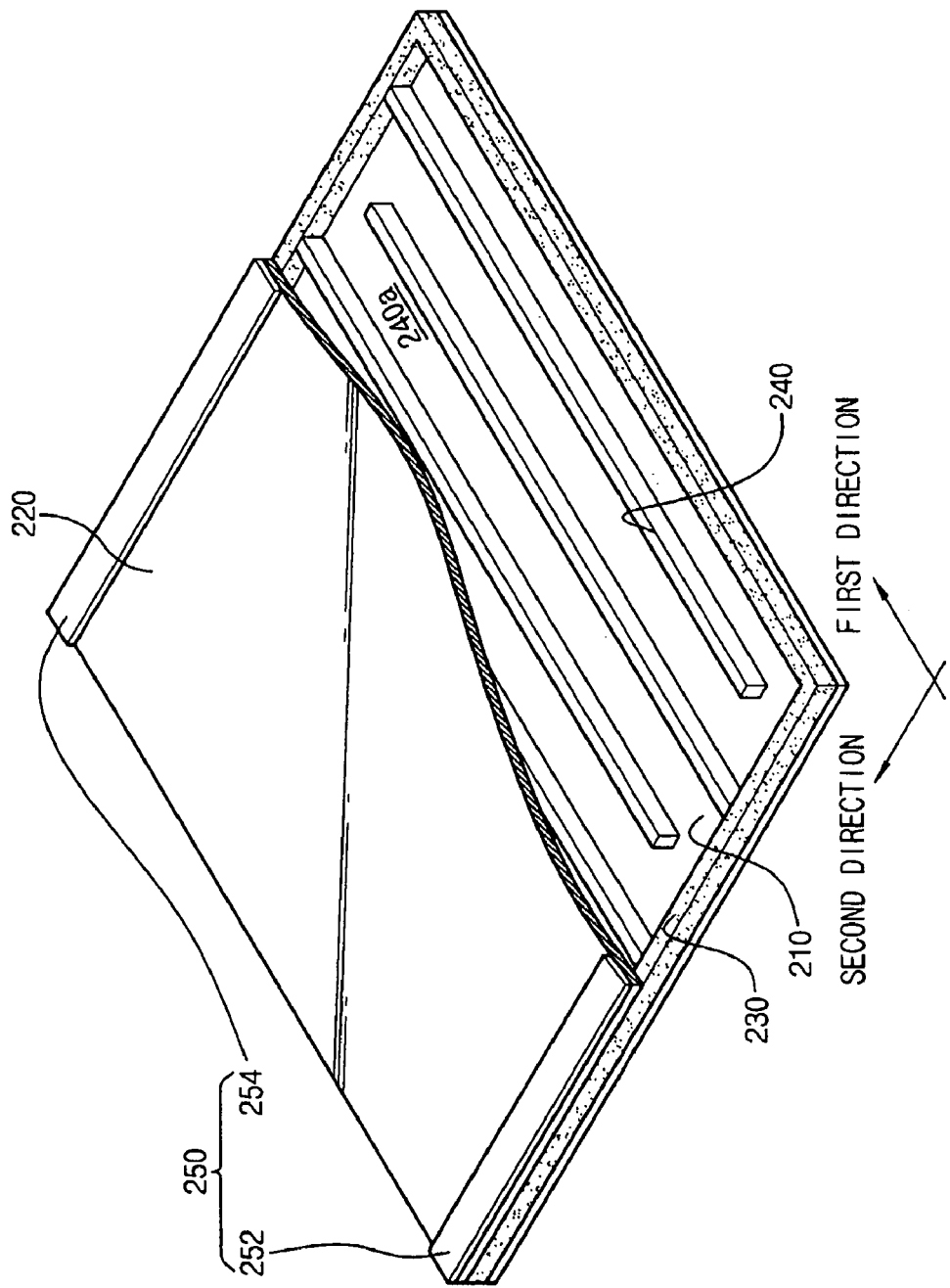
FIG. 16 is a perspective view showing a flat fluorescent lamp of a backlight assembly according to an embodiment of the invention.

FIG. 16 is a perspective view showing a flat fluorescent lamp of a backlight assembly according to an embodiment of the invention. Referring to FIG. 16, a flat fluorescent lamp 200 includes a first substrate 210, a second substrate 220, a sealing member 230, a partition member 240 and a set of discharge electrodes 250. The first substrate 210 may be rectangular shaped and may be optically transparent. For example, a glass substrate having a rectangular shape may be used as the first substrate 210.

The second substrate 220 may be rectangular shaped and may be optically transparent. Alternatively, the second substrate 210 may be opaque. The second substrate 220 may have a substantially identical shape as the first substrate 210. Additionally, the second substrate 220 may have a substantially identical size, e.g., area, as the first substrate 210.

The sealing member 230 is provided between the first substrate 210 and the second substrate 220. The sealing member 230 may have a rectangular frame-like shape. The sealing member 230 is provided at an edge portion between the first substrate 210 and the second substrate 220 and defines a space at a center region between the first substrate 210 and the second substrate 220.

The partition member 240 is provided in the space 240a defined by the sealing member 230 between the first substrate 210 and the second substrate 220. The partition member 240 divides the space into at least two discharge spaces. The partition member 240 may have a through hole connecting the two discharge spaces positioned adjacent to each other. Each of the discharge spaces is extended along a first direction and arranged along a second direction that is substantially perpendicular to the first direction. For example, when the flat fluorescent lamp 200 is provided over the conductive receiving container, the insulating members may be provided at each corner of the conductive receiving container so that one of the insulating members may overlap no more than two discharge spaces of the flat fluorescent lamp.

The discharge spaces are filled with discharge gas (not shown). Thus, when electric power is applied to the discharge gas, the discharge gas generates invisible light, such as ultraviolet light.

The discharge electrode set 250 includes a first electrode 252 and a second electrode 254. The first electrode 252 may be provided at a first end portion of the second substrate 220, and the second electrode 254 may be provided at a second end portion of the second substrate that is opposite to the first end portion. The first electrode 252 and the second electrode 254 are positioned such that a longitudinal direction of the first electrode 252 and the second electrode 254 is substantially perpendicular to a longitudinal portion of the partition member 240. The first electrode 252 and the second electrode 254 are provided on an outer surface of the second substrate 220. The first electrode 252 and the second electrode 254 may be provided on at least one of the outer surfaces of the first electrode 252 and the second electrode 254. The first electrode 252 and the second electrode 254 may be provided in the space defined between the first substrate 210 and the second substrate 220.

When a discharge voltage is applied to the first electrode 210 and the second electrode 220, the discharge gas generates invisible light, such as ultraviolet light. The invisible light generated by the discharge gas is transformed into visible light by a fluorescent layer, which is provided on the inner surface of the first substrate 210, and the visible light travels through the first substrate 210. The fluorescent layer may be formed on a surface of the partition member 240 and the second substrate 220.

Figure 17:
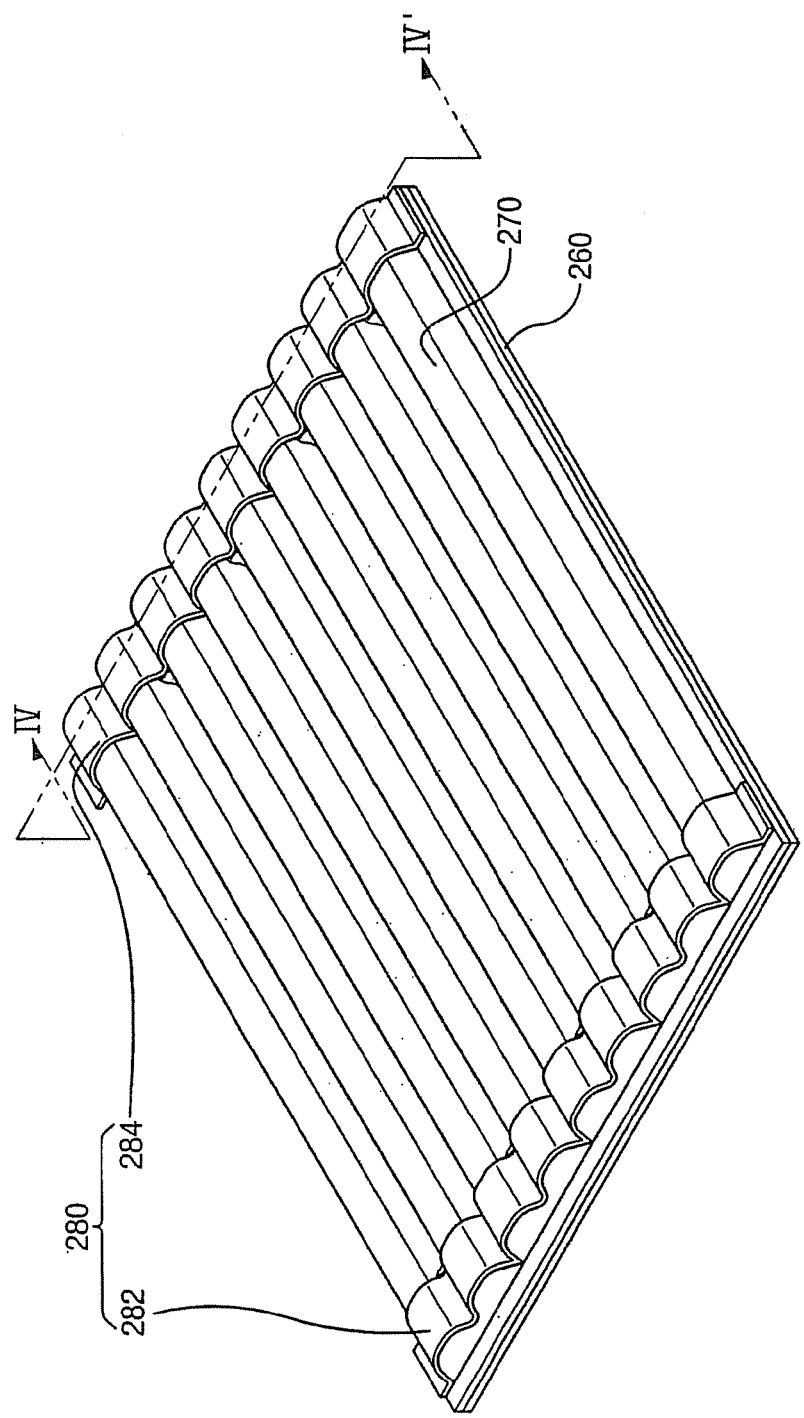
FIG. 17 is a perspective view showing a flat fluorescent lamp of a backlight assembly according to an embodiment of the invention.
Figure 18:
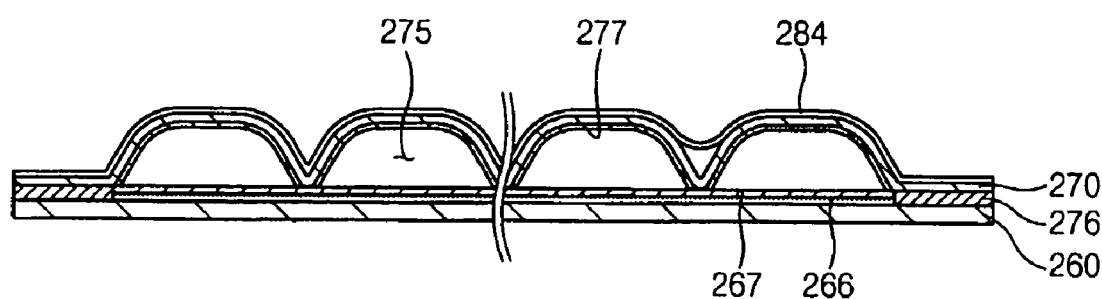
FIG. 18 is a cross-sectional view taken along a line IV–IV' shown in FIG. 17.

FIG. 17 is a perspective view showing a flat fluorescent lamp of a backlight assembly according to an embodiment of the invention. FIG. 18 is a cross-sectional view taken along a line IV–IV' shown in FIG. 17.

Referring to FIG. 17 and FIG. 18, a flat fluorescent lamp 200 includes a first substrate 260, a second substrate 270 and a discharge electrode set 280. The first substrate 260 may be rectangular shaped and may be optically transparent. For example, the first substrate 260 may be a glass substrate that transmits visible light and blocks invisible light.

The second substrate 270 may be combined with the first substrate 260. When the first substrate 260 and the second substrate 270 are combined, at least two discharge spaces 275 are defined between the first substrate 260 and the second substrate 270. For example, the second substrate 270 may be a glass substrate that transmits visible light and blocks invisible light.

The second substrate 270 may include grooves. When the first substrate 260 and the second substrate 270 are combined, an inner surface portion of the second substrate 270, which corresponds to the channels, contacts the first substrate 260 and defines the discharge spaces 275. The discharge spaces 275 are substantially parallel with each other and spaced apart from each other. The second substrate 270 having the channels may be manufactured through a forming process. Specifically, according to an embodiment of the invention, a second substrate having a rectangular or plate-like shape is heated and compressed to form the second substrate 270 having the channels. A cross-section of the discharge spaces 275, which is taken along a line that is substantially perpendicular to a longitudinal direction of the discharge spaces 275, may have various shapes, such as a trapezoidal shape, a rectangular shape, a semi-circular shape, etc.

The first substrate 260 and the second substrate 270 are combined using a sealing member 276, such as, for example, frit. The frit may include metal, such as lead (Pb). The frit has a lower melting point temperature than pure glass. The sealing member 276 is provided between the first substrate 260 and the second substrate 270 and heated to combine the first substrate 260 and the second substrate 270. The inner surface of the second substrate 270, which corresponds to the surface having the channels, contacts the first substrate 260 due to a difference between atmospheric pressure and a pressure of the discharge spaces 275.

When the first substrate 260 and the second substrate 270 are combined, the discharge spaces 275 is filled with discharge gas (not shown). The discharge gas may include, for example, mercury (Hg), argon (Ar), neon (Ne), xenon (Xe), krypton (Kr), etc.

The discharge electrode set 280 includes a first electrode 282 and a second electrode 284. The first electrode 282 may be provided at a first end portion of an outer surface of the second substrate 270. The second electrode 284 may be provided at a second end portion of an outer surface of the second substrate 270. The first end portion and the second end portion are positioned opposite to each other. The first electrode 282 and the second electrode 284 are positioned such that a longitudinal direction of the first electrode 282 and the second electrode 284 is substantially perpendicular to a longitudinal direction of the discharge spaces 275. The first electrode 282 and the second electrode 284 overlap each of the discharge spaces 275. The first electrode 282 and the second electrode 284 include a metal material having high electrical conductivity. For example, the first electrode 282 and the second electrode 284 include, for example, copper (Cu), nickel (Ni), aluminum (Al), silver (Ag), etc.

The first electrode 282 and the second electrode 284 may be formed, for example, with an aluminum tape, silver paste, etc. A discharge voltage is applied to the discharge gas through the first electrode 282 and the second electrode 284. The first electrode 282 and the second electrode 284 may be disposed on at least one of the outer surfaces of the first substrate 260 and the second substrate 270.

When the discharge spaces 275 have different, luminance of light generated from each discharge spaces 275 is not uniform throughout the discharge spaces 275. To make the pressure of the discharge spaces 275 uniform, the discharge spaces 275 are connected together.

The flat fluorescent lamp 200 may further include a light-reflecting layer 266 and a first fluorescent layer 267. The light-reflecting layer 266 is provided on an inner surface of the first substrate 260. The first fluorescent layer 267 is provided on the light-reflecting layer 266. The light-reflecting layer 266 reflects light that travels toward the first substrate 260 and the second substrate 270. The first fluorescent layer 267 transforms invisible light generated from discharge gas, such as ultraviolet light, into visible light.

The flat fluorescent lamp 200 may further include a second fluorescent layer 277 provided on an inner surface of the second substrate 270. The second fluorescent layer 277 transforms invisible light generated from discharge gas, such as ultraviolet light, into visible light.

Figure 19:
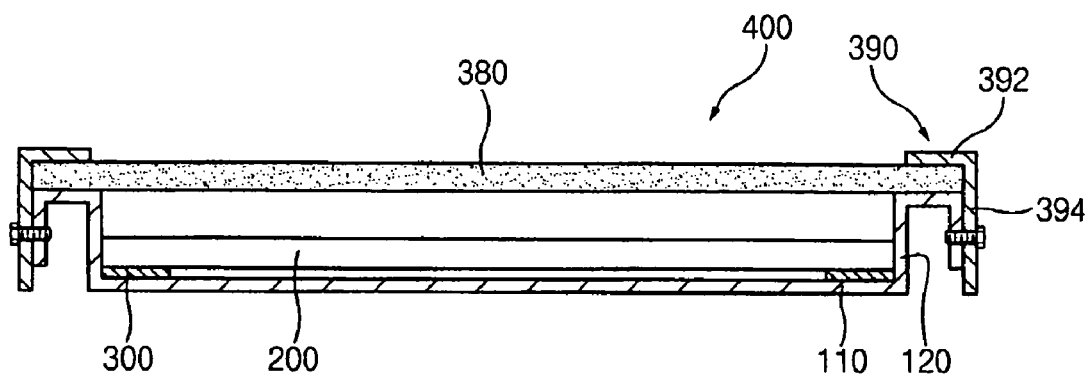
FIG. 19 is a cross-sectional view showing a backlight assembly according to an embodiment of the invention.

FIG. 19 is a cross-sectional view showing a backlight assembly according to an embodiment of the invention. Referring to FIG. 19, a backlight assembly 400 further includes a light-diffusing member 380 and a chassis 390. The light-diffusing member 380 may be provided is over the conductive receiving container 100 such that the light-diffusing member 380 is spaced apart from the flat fluorescent lamp 200.

The light-diffusing member 380 includes a binder and a plurality of light-diffusing beads provided in the binder. The light-diffusing member 380 diffuses light to make the light luminance uniform or improve the uniformity thereof.

The chassis 390 has a frame shape having an L-shaped cross-section that includes a first portion 392 and a second portion 394 that is positioned perpendicular to the first portion 392. The chassis 390 is formed around, e.g., surrounding, the light-diffusing member 380 and is combined with the sidewall 100 of the conductive receiving container 100 to fasten or attach the light-diffusing member 380 with the conductive receiving container 100.

Figure 20:
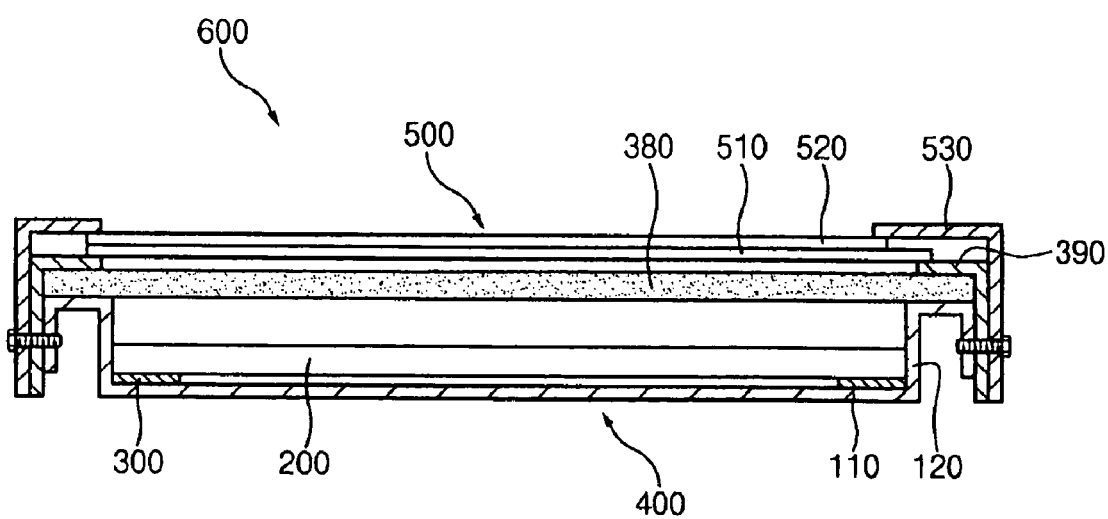
FIG. 20 is a cross-sectional view showing a display device according to an embodiment of the invention.

FIG. 20 is a cross-sectional view showing a display device according to an embodiment of the invention. The display device uses one of backlight assemblies described above and shown in FIGS. 1 through 19. Therefore, for purposes of convenience, the same reference numerals are used to refer the same or similar parts as those described above, and any further explanation about the backlight assembly is omitted as necessary.

Referring to FIG. 20, a display device 600 includes a backlight assembly 400 and a display panel 500. The display panel transforms light generated from the backlight assembly 400 into a displayable image. The display panel corresponds with, for example, a flat panel display, such as a liquid crystal display (LCD) panel.

A chassis 530 fastens or attaches the display panel 500 with the backlight assembly 400. The chassis 530 also forms a protective barrier for the display panel 500.

The display panel 500 includes a thin film transistor (TFT) substrate 510, a color filter substrate 520 and a liquid crystal layer (not shown). The TFT substrate 510 includes a transparent glass substrate (not shown), and a plurality of pixel electrodes (not shown) arranged in a matrix shape. Pixel voltages corresponding to an image are applied to each of the pixel electrodes to display the image.

The color filter substrate 520 faces the TFT substrate 510. The color filter substrate 520 includes a transparent glass substrate (not shown), a plurality of color filters (not shown) corresponding to the pixel electrodes, and a common electrode (not shown).

The TFT substrate 510 and the color filter substrate 520 are combined with each other such that the pixel electrodes of the TFT substrate 510 face the color filters of the color filter substrate 520. The liquid crystal layer is provided between the TFT substrate 510 and the color filter substrate 520.

When the pixel voltages are applied to the pixel electrodes, electric fields are generated between the pixel electrode and the common electrode in order to change an arrangement of liquid crystal molecules of the liquid crystal layer so that optical transmissivity of the liquid crystal layer changes to display the image.

According to the invention, light luminance is improved and heats may be sufficiently dissipated, thereby improving display quality.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A backlight assembly apparatus, comprising:
   a conductive receiving container comprising a bottom plate and walls extending from edge portions of the bottom plate;
   a flat fluorescent lamp provided over the conductive receiving container; and
   an insulating member provided between the conductive receiving container and the flat fluorescent lamp to provide insulation;
   wherein the insulating member comprises at least one hole so that the flat fluorescent lamp faces the bottom plate via the hole.

2. The apparatus of claim 1, wherein the insulating member further comprises at least one recessed portion recessed from a side face of the insulating member.

3. The apparatus of claim 2, wherein the recessed portion has at least one of a triangular shape, a rectangular shape, a trapezoidal shape, and/or a semicircular cross-sectional shape.

4. The apparatus of claim 1, wherein the insulating member further comprises least one recessed portion so that the flat fluorescent lamp faces the bottom plate of the conductive receiving container via the hole and the recessed portion.

5. The apparatus of claim 1, wherein the insulating member is provided at an edge portion of the flat fluorescent lamp.

6. The apparatus of claim 1, wherein the insulating member is L-shaped and provided at a corner portion of the flat fluorescent lamp.

7. The apparatus of claim 6, further comprising:
   an impact-absorbing member provided on the conductive receiving container.

8. The apparatus of claim 1, further comprising:
   an impact-absorbing member provided between the flat fluorescent lamp and the insulating member.

9. The apparatus of claim 8, wherein the insulating member further comprises a first recession, and
   wherein the impact-absorbing member further comprises a second hole and/or a second recession corresponding with the at least one hole and the first recession, respectively.

10. The apparatus of claim 1, wherein the insulating member is a frame-like shape.

11. The apparatus of claim 1, further comprising:
a combining member provided between the sidewalls and a side face of the flat fluorescent lamp to couple the flat fluorescent lamp with the conductive receiving container.

12. The apparatus of claim 11, wherein the combining member comprises:
a first combining portion provided between the sidewalls and the side face of the flat fluorescent lamp; and
a second combining portion extending from the first combining portion and contacting an upper face of the flat fluorescent lamp.

13. The apparatus of claim 1, wherein the flat fluorescent lamp comprises:
a first substrate having a first fluorescent layer transforming invisible light into visible light;
a second substrate facing the first substrate, the second substrate having a second fluorescent layer transforming invisible light into visible light;
a sealing member provided between the first substrate and the second substrate to define a space filled with a discharge gas;
a partition member provided in the space dividing the space into a plurality of discharge spaces;
a first electrode provided at a first end of an outer surface of the first substrate; and
a second electrode provided at a second end of an outer surface of the first substrate that is opposite to the first end.

14. The apparatus of claim 13, wherein the discharge spaces extend along a first direction and are arranged along a second direction that is substantially perpendicular to the first direction.

15. The apparatus of claim 14, wherein the insulating member overlaps one or two of the discharge spaces.

16. The apparatus of claim 1, wherein the flat fluorescent lamp comprises:
a first substrate comprising a first fluorescent layer transforming invisible light into visible light;
a second substrate having a plurality of channels defining a discharge space, the second substrate having a second fluorescent layer transforming invisible light into visible light;
a first electrode provided at a first end of art outer surface of the first substrate and/or the second substrate; and
a second electrode provided at a second end of an outer surface of the first substrate and/or the second substrate,
wherein the second end is positioned opposite to the first end.

17. The apparatus of claim 1, further comprising:
a light-diffusing member provided over the flat fluorescent lamp to make light luminance uniform.

18. The apparatus of claim 1, further comprising:
a chassis surrounding the flat fluorescent lamp and attaching the flat fluorescent lamp with the conductive receiving container.

19. A backlight assembly apparatus, comprising:
a conductive receiving container comprising a bottom plate and sidewalls extending from edge portions of the bottom plate;
a flat fluorescent lamp provided on the conductive receiving container and over the bottom plate;
a heat-transferring member to transfer heat generated from the flat fluorescent lamp to the conductive receiving; and
an insulating member provided between the conductive receiving container and the flat fluorescent lamp and including the heat-transferring member;
wherein the heat-transferring member includes a hole through which the flat fluorescent lamp faces the bottom plate of the conductive receiving container.

20. The apparatus of claim 19, wherein the heat-transferring member further includes at least one recessed portion positioned at a side face of the insulating member.

21. The apparatus of claim 19, wherein the heat-transferring member further includes is at least one recessed portion positioned at a side face of the insulating member, the recessed portion is selected from a group of shapes consisting of at least one of a triangular shape, a rectangular shape, a trapezoidal shape, and a semicircular cross-sectional shape.

22. The apparatus of claim 19, wherein the heat-transferring member further includes a recessed portion positioned such that the flat fluorescent lamp faces the bottom plate of the conductive receiving container through the hole and the recessed portion.

23. A display device comprising the backlight assembly apparatus of claim 1 and a display panel transferring light generated from the backlight assembly apparatus into an image.

24. The display device of claim 23, wherein the display panel comprises:
a first substrate including a plurality of pixel electrodes receiving a driving voltage corresponding to an image;
a second substrate facing the first substrate, the second substrate including a common electrode; and
a liquid crystal layer provided between the first substrate and the second substrate.

* * * * *